US010365150B2

(12) United States Patent
Natarajan

(10) Patent No.: US 10,365,150 B2
(45) Date of Patent: Jul. 30, 2019

(54) TRAVEL FACILITATION SYSTEM

(71) Applicant: INEYE TECHNOLOGIES LLC, South Grafton, MA (US)

(72) Inventor: Preethi Natarajan, South Grafton, MA (US)

( * ) Notice: Subject to any disclaimer, the term of this patent is extended or adjusted under 35 U.S.C. 154(b) by 138 days.

(21) Appl. No.: 15/603,870

(22) Filed: May 24, 2017

(65) Prior Publication Data

US 2017/0343409 A1  Nov. 30, 2017

Related U.S. Application Data

(60) Provisional application No. 62/340,585, filed on May 24, 2016.

(51) Int. Cl.
| | |
|---|---|
| G01G 19/58 | (2006.01) |
| G01G 23/37 | (2006.01) |
| A45C 13/00 | (2006.01) |
| G06Q 10/02 | (2012.01) |
| A45C 13/42 | (2006.01) |
| A45C 13/28 | (2006.01) |

(52) U.S. Cl.
CPC .......... *G01G 19/58* (2013.01); *A45C 13/001* (2013.01); *A45C 13/28* (2013.01); *A45C 13/42* (2013.01); *G01G 23/3735* (2013.01); *G01G 23/3742* (2013.01); *G06Q 10/02* (2013.01)

(58) Field of Classification Search
CPC .............. G01G 19/58; G01G 23/3728; G01G 23/3735; G01G 23/3742; G01G 23/002; G01G 19/40; G01G 19/413; G01G 19/4148; A45C 13/28; A45C 13/42; A45C 13/001; G06Q 10/02

See application file for complete search history.

(56) References Cited

U.S. PATENT DOCUMENTS

| | | | | |
|---|---|---|---|---|
| 5,150,760 A | * | 9/1992 | Johnson | G01G 19/00 177/136 |
| 6,236,001 B1 | * | 5/2001 | Shymko | G01G 19/56 177/149 |
| 6,538,215 B2 | * | 3/2003 | Montagnino | G01G 19/4146 128/921 |
| 7,084,357 B2 | * | 8/2006 | Roberts | A45C 15/00 177/131 |

(Continued)

*Primary Examiner* — Randy W Gibson
(74) *Attorney, Agent, or Firm* — Kriegsman & Kriegsman

(57) ABSTRACT

A system for facilitating travel includes a handheld device for weighing luggage that is electronically linked with an application server via a smart device. The device includes electronics disposed within a housing configured to conform to a luggage handle. Lifting the luggage with the device disposed against its handle causes the luggage weight to impart a force onto the housing. This force is sensed by the electronics and converted into a weight measurement that is displayed on the smart device and sent to the application server. Weight measurements stored on the application server can be integrated with airline flight information, such as baggage restrictions, to provide certain advantages. For instance, weight measurements can be retrieved by a traveler to ensure baggage compliance. Additionally, historical luggage data can reviewed by an airline on a flight-based level to prepare for atypical cargo loads or on a traveler-basis to incentivize light baggage travel.

15 Claims, 13 Drawing Sheets

(56) References Cited

U.S. PATENT DOCUMENTS

| | | | | |
|---|---|---|---|---|
| 7,238,895 B2* | 7/2007 | Dittrich | ............... | G01G 19/58 |
| | | | | 177/126 |
| 7,358,449 B2* | 4/2008 | Hannon | ............... | A45C 13/28 |
| | | | | 177/131 |
| 7,732,719 B1 | 6/2010 | Schantz | | |
| 8,987,616 B2* | 3/2015 | Ngoh | ............... | A61G 7/108 |
| | | | | 177/144 |
| 9,518,861 B2* | 12/2016 | Aumente | ............... | B64F 1/366 |
| 10,123,603 B1* | 11/2018 | Glickman | ............... | A45C 15/06 |
| 2010/0046152 A1* | 2/2010 | Ghobrial | ............... | B64F 1/366 |
| | | | | 361/679.4 |
| 2011/0100726 A1* | 5/2011 | Wu | ............... | A45C 13/28 |
| | | | | 177/132 |
| 2012/0161975 A1* | 6/2012 | Stewart | ............... | G01G 19/58 |
| | | | | 340/666 |
| 2013/0043079 A1* | 2/2013 | Levin | ............... | G01G 19/58 |
| | | | | 177/1 |
| 2015/0178641 A1* | 6/2015 | Yepez | ............... | G06Q 10/02 |
| | | | | 705/5 |

* cited by examiner

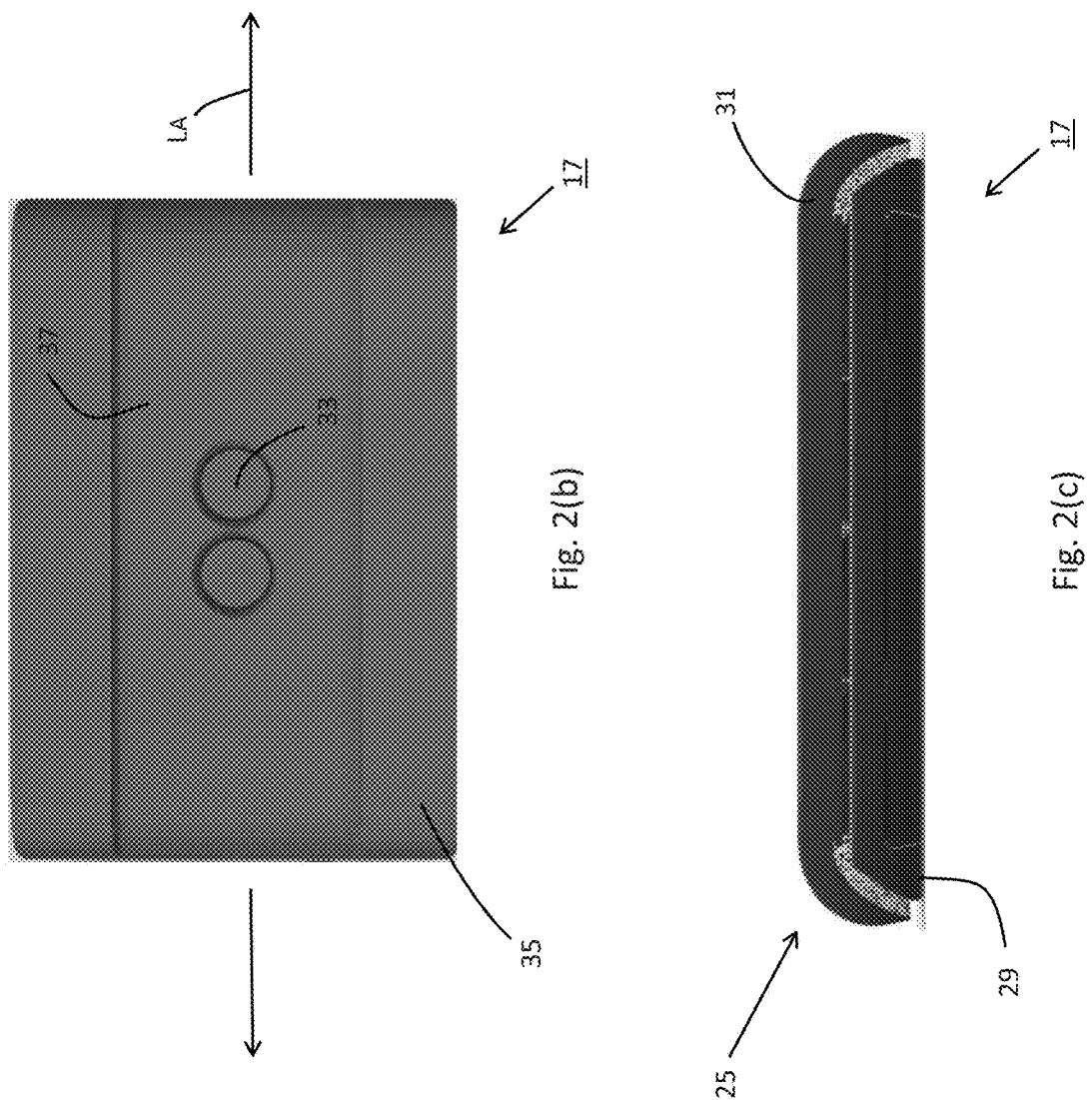

| Bag # | Wt. (lbs) |
|---|---|
| 1 | 45 |
| 2 | 30 |

Weight Results

Fig. 8

Shock Report

High
11/27/15 10:02 AM

Medium
11/27/15 4:10 PM

High
11/28/15 12:01 AM

Fig. 5(c)

| Percentage of Baggage allowance | Score Level |
|---|---|
| 90 - 100% | Basic |
| 75 - 90% | Blue |
| 60 - 75% | Silver |
| 45 - 60% | Gold |
| 30 - 45% | Platinum |
| < 30% | Diamond |

TRAVEL FACILITATION SYSTEM

FIELD OF THE INVENTION

The present invention relates generally to transportation service providers, such as commercial airlines, and, more particularly, to devices utilized to weigh luggage in order to ensure weight compliance with baggage restrictions imposed by such providers.

BACKGROUND OF THE INVENTION

Transportation service providers typically enforce strict rules regarding baggage utilized in accompanying travel. Notably, in the airline industry, commercial airlines maintain regulations regarding the weight of each piece of luggage requiring transport. Any baggage that exceeds the provider-defined weight threshold is typically charged an additional fee that is commensurate with its measured weight.

Accordingly, in preparation of travel, passengers often weigh luggage in need of transport prior to check-in to ensure compliance with transportation service provider baggage restrictions. Often, handheld weight measurement devices, which are commonly referred to in the art as luggage scales, are used by travelers to weigh luggage. As can be appreciated, the relatively small size afforded by such a scale renders it portable and therefore usable at various stages throughout the travel itinerary.

One type of luggage scale, known in the art as a hanging luggage scale, includes a handle from which is suspended a connective element, or tether, consisting of a hook, strap or some combination thereof. In use, the tether is coupled to the luggage, for example, by wrapping an elongated strap around the luggage handle and, in turn, securing the strap into a closed loop configuration with complementary fasteners. The user then grasps the handle and lifts the luggage off the floor surface. The weight of the suspended luggage is measured by a sensor internally-housed within the handle in communication with the connective element. After a designated suspension period, the calculated weight is shown on a display provided in the handle. An example of a hanging luggage scale is shown in U.S. Pat. No. 7,732,719 to B. L. Schants, the disclosure of which is incorporated herein by reference.

Although well-known and widely used in the art, hanging luggage scales of the type referenced above have been found to suffer from a few notable shortcomings.

As a first shortcoming, hanging luggage scales of the type described above require a significant level of manual dexterity and strength during routine use. Namely, the process of coupling, and subsequently decoupling, the connective element to the handle of each piece of luggage in need of weighing is rather tedious. Furthermore, due to the length of the tether, the handle typically needs to be lifted substantially high above the floor surface (e.g., approximately 4-5 feet above the floor surface). Because packed luggage is often relatively heavy, it has been found that certain travelers often lack the strength to lift the scale handle at an adequate level above the floor surface for the requisite period to collect an accurate measurement.

As a second shortcoming, hanging luggage scales of the type described above are not typically provided with means for storing weight measurements. Rather, travelers customarily rely on memory to differentiate between measurements taken across multiple pieces of luggage. Because each piece of luggage is frequently repacked or otherwise readjusted during the course of travel, thereby affecting its weight, the traveler is often unaware whether the baggage has remained in compliance with weight restrictions.

As a third shortcoming, weight measurements taken using hanging luggage scales of the type described above are used solely by the traveler and not by the transportation service provider. Instead, at check-in, the service provider engages in a completely independent luggage inspection and weight measurement process. This disconnect of information between the traveler and the transportation service provider contributes to a highly inefficient and time-consuming travel process. Furthermore, because baggage weight data is only compiled moments before travel, transportation service providers are not typically afforded with adequate time to make suitable accommodations for atypical loads. Among other things, this lack of preparation creates certain inefficiencies, for instance, with respect to fuel requirements.

SUMMARY OF THE INVENTION

It is an object of the present invention to provide a new and improved system for facilitating travel.

It is another object of the present invention to provide a travel facilitation system of the type as described above that enables a passenger to weigh luggage with considerable ease and accuracy.

It is yet another object of the present invention to provide a travel facilitation system of the type as described above that compiles detailed historical luggage weight data for review, as needed.

It is still another object of the present invention to provide a travel facilitation system of the type as described above that is useful in streamlining the traveler check-in process.

Accordingly, as a feature of the present invention, there is provided a system for facilitating travel, comprising (a) a first weight measurement device, the first weight measurement device being adapted to measure the weight of a first set of luggage, and (b) a travel facilitator, the travel facilitator comprising a central controller separate from and in electronic communication with the first weight measurement device, the central controller receiving the measured weight of each luggage in the first set, (c) wherein the measured weight of each luggage in the first set is configured for electronic retrieval by a selection of users in electronic communication with the central controller.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIGS. 2(a)-(c) are top perspective, top, and front views, respectively, of the handheld weight measurement device shown in FIG. 1;

FIGS. 5(a)-(c) are a series of sample screen displays of the smart device shown in FIG. 1, the sample screen displays being useful in understanding certain functionality afforded by the handheld weight measurement device;

FIG. 8 is a sample screen display of the smart device shown in FIG. 1, the sample screen display illustrating a set of recent weight measurements;

FIG. 9 is a sample chart for a rewards system implemented using luggage weight data compiled by the travel facilitation system of FIG. 1.

DETAILED DESCRIPTION OF THE INVENTION

Travel Facilitation System 11

Figure 1:
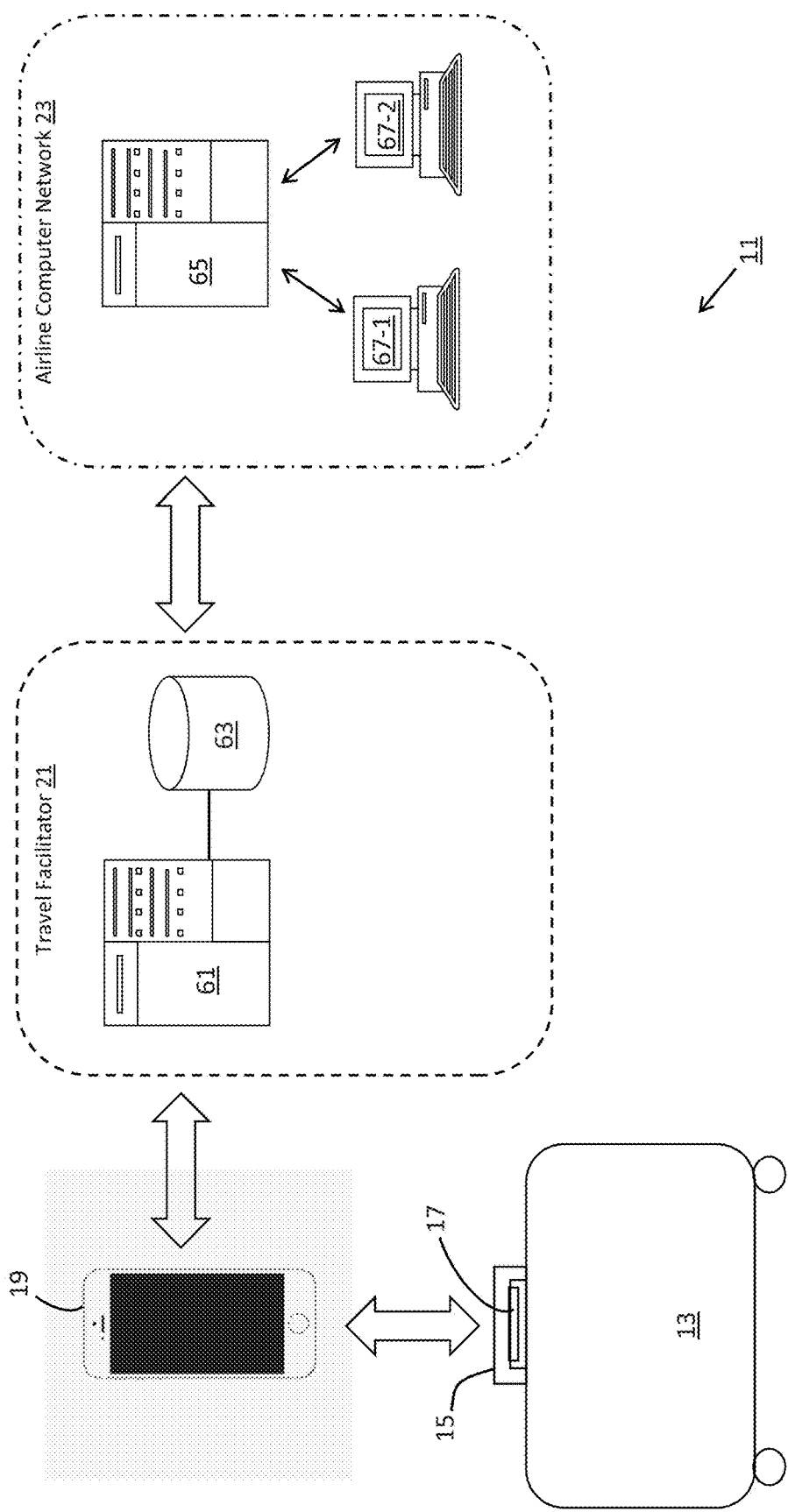
FIG. 1 is a simplified schematic representation of a travel facilitation system constructed according to the teachings of the present invention, the travel facilitation system being shown with a piece of luggage to be weighed.
Figure 2A:
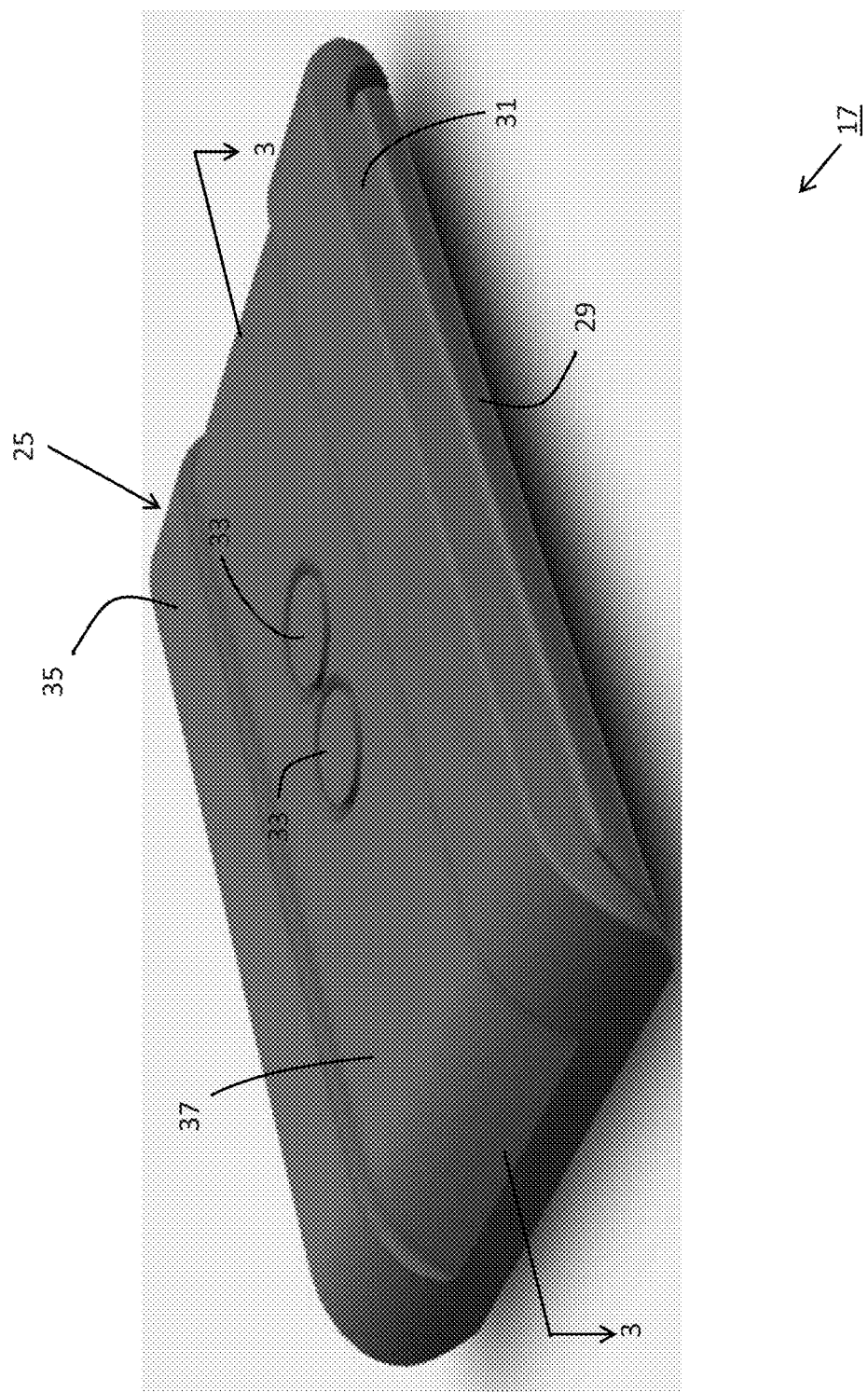

Referring now to FIG. 1, there is shown a simplified schematic representation of a travel facilitation system constructed according to the teachings of the present invention, the system being identified generally by reference numeral 11. As will be described in detail below, system 11 is designed to measure the weight of luggage 13 and, in turn, aggregate weight measurement data for use in facilitating, and even promoting, travel.

In the description that follows, system 11 is described primarily in connection with airline travel. However, it should be noted that system 11 is not limited to any particular commercial travel industry. Rather, it is to be understood that system 11 could be applied in any field of commercial travel that requires or would otherwise benefit from collecting, analyzing, and/or processing luggage weight data.

Luggage 13 represents any conventional bag, suitcase, or other similar travel container commonly used in commercial transportation. For reasons to become apparent below, it is required that luggage 13 has an integral handle 15 or other similar construct that allows for lifting luggage 13 above the floor surface.

As can be seen, system 11 comprises a handheld weight measurement device 17 that is specifically designed to conform to handle 15 of luggage 13, a smart device 19 in electronic communication with weight measurement device 17 for receiving luggage weight data measured by device 17, a travel facilitator 21 in communication with mobile device 19 for aggregating and analyzing luggage weight data accumulated from a variety of sources, and at least one airline computer network 23 in communication with facilitator 21 for utilizing luggage weight information compiled by facilitator 21 to, inter alia, analyze and even incentivize aspects of airline travel.

Handheld Weight Measurement Device 17

Device 17 operates in connection with mobile device 19 to measure the weight of luggage 13 through a simple and accurate weighing process. As will be explained in detail below, the particular construction of weight measurement device 17 and its integration within the larger travel facilitation system 11 serve as principal novel features of the present invention.

Referring now to FIGS. 2(a), 2(b), 2(c) and 3, weight measurement device 17 is constructed as a compact, ergonomic, and light handheld unit that is adapted for use with luggage 13. As will be described in detail below, device 17 is designed to directly conform to the underside of luggage handle 15, thereby enabling weight measurements to be taken simply by lifting luggage 13 using handle 15, which is a notable feature of the present invention.

Weight measurement device 17 comprises an outer housing 25 inside which is disposed electronics 27. As part of the novel operation of device 17, electronics 27 measures forces applied to housing 25 which, in turn, can be used to accurately calculate the weight of luggage 13.

Outer housing 25 is generally planar in design and is preferably constructed of a suitable gripping material for reasons to become apparent below. Housing 25 includes a base 29 onto which a cover 31 is mounted. A pair of pins 33 extends transversely between base 29 and cover 31 so to preclude disassociation.

Figure 3:
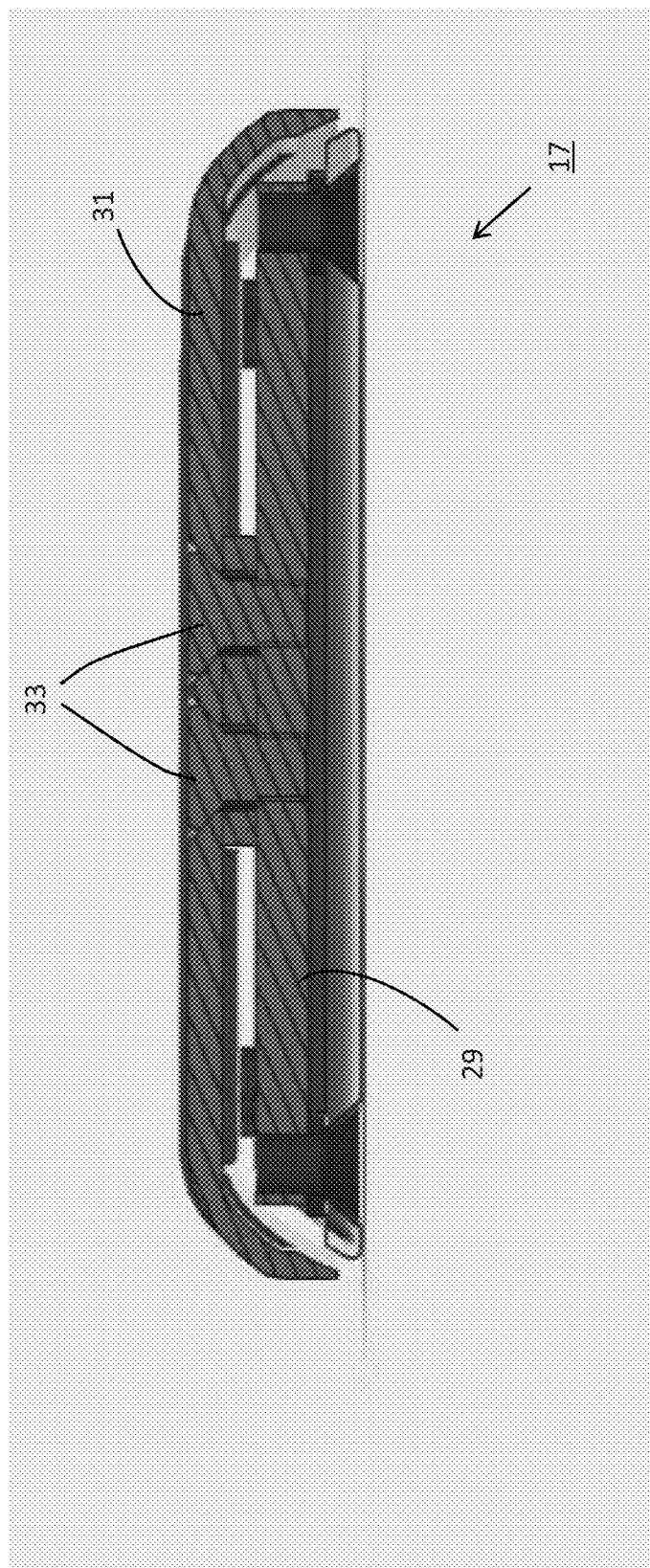
FIG. 3 is a section view of the handheld weight measurement device shown in FIG. 2(a), taken along lines 3-3.

As seen most clearly in FIG. 3, cover 31 is spaced slightly apart from base 29 and is adapted to bi-directionally displace along pins 33 (i.e., towards and away from base 29 along a path orthogonal to the longitudinal axis $L_A$ of device 17). With base 29 and cover 31 arranged in a front-to-back, stacked relationship, forces applied onto housing 25 created from lifting luggage 13 compress base 29 and cover 31 together in manner that can used to determine the weight of luggage 13.

As referenced briefly above, device 17 is uniquely configured to conform to the underside of handle 15. As seen most clearly in FIGS. 2(a) and 2(b), cover 31 has a generally rectangular footprint and includes a flat top surface 35. A longitudinal channel, or recess, 37 is formed in top surface 35 and is dimensioned to receive the underside of handle 15 to ensure proper alignment.

Figure 4:
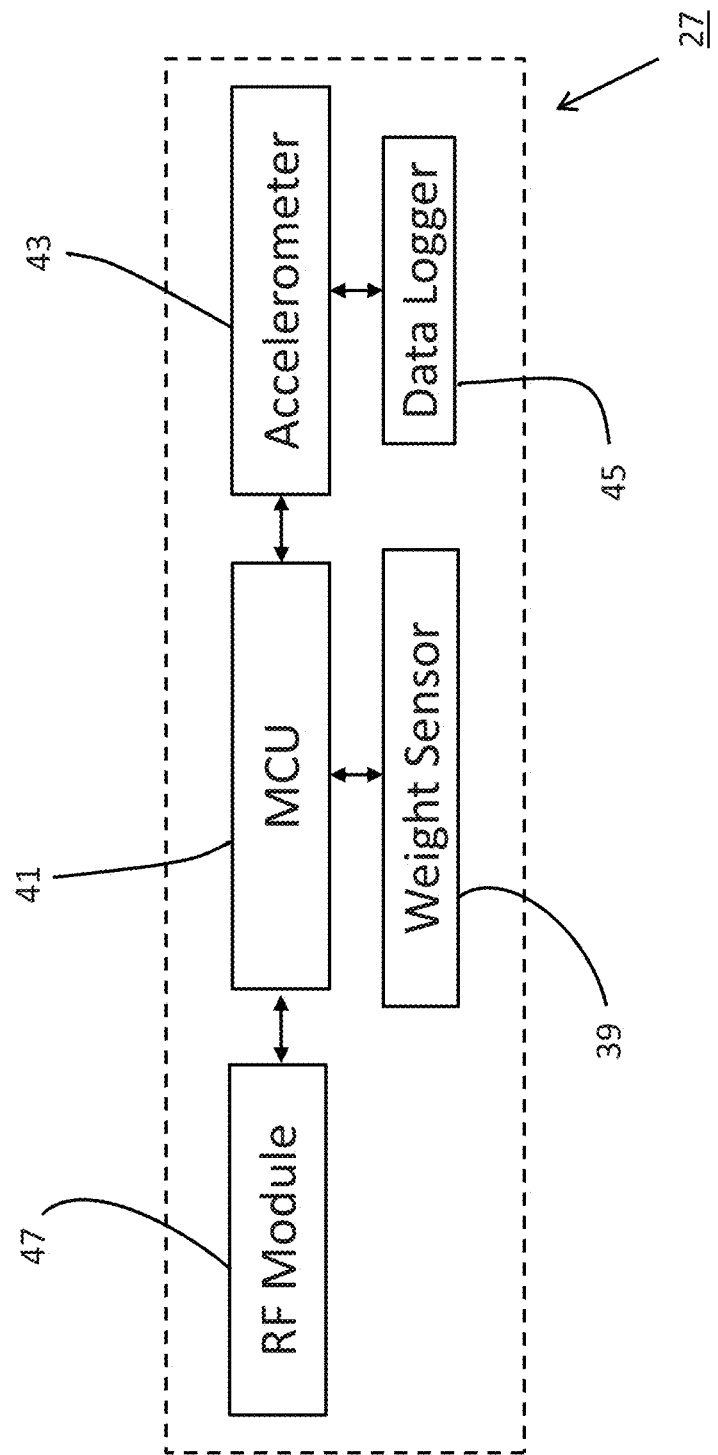
FIG. 4 is a simplified schematic representation of the electronics for the handheld weight measurement device shown in FIG. 1.

Referring now to FIG. 4, there is shown a simplified schematic representation of the internally-housed electronics 27 for device 17. Although not shown herein, it is to be understood that certain components of electronics 27 are preferably mounted on a common printed circuit board (PCB) for ease of assembly.

Electronics 27 comprise a weight sensor 39 for measuring compressive forces applied to outer housing 25, a microcontroller (MCU) 41 in electrical connection with weight sensor 39 for translating the compressive force applied onto housing 25 into a corresponding luggage weight measurement, an accelerometer 43 in electrical connection with microcontroller 41 for ensuring proper orientation of device 17 to ensure accurate weight measurement, a data logger 45 in electrical connection with accelerometer 43, and a radio frequency (RF) module 47 in electrical connection with microcontroller 41 for transmitting and receiving communication signals with smart device 19 during the weight measurement process.

Weight sensor 39 is sandwiched between base 29 and cover 31 and represents any device that can be used to measure forces applied thereto. For instance, weight sensor 39 may be in the form of a load cell, or other type of transducer, that generates an electrical signal that is proportional in magnitude to the received force.

Microcontroller 41 is specifically programmed to receive signals generated from weight sensor 39 and, in turn, translate each received signal into a corresponding weight measurement. In other words, because the compressive force applied onto housing 25 when lifting luggage 13 is proportional to the luggage weight, MCU 41 can be programmed with an appropriate conversion formula to readily calculate luggage weight.

Accelerometer 43 represents any sensor that is able to monitor relative position and motion. As will be explained further below, the entire weight of luggage 13 is only imparted onto housing 25 of device 17 when longitudinal axis $L_A$ of device 17 extends in an orthogonal relationship relative to the line of gravity for luggage 13.

As an additional feature of the present invention, data logger 45 is provided to compile data (e.g., a time and date stamp) of any usual movement perceived by accelerometer 43. For instance, any excessive shock forces detected by accelerometer 43 are logged by data logger 45 in order to account for potential luggage mishandling. In the present embodiment, accelerometer 43 is designed to monitor shock forces. However, it is to be understood that a separate, designated shock sensor could be integrated into electronics 27 to provide the aforementioned shock detection feature.

Weight Measurement Process

Together, weight measurement device 17 and smart device 19 can be used to weigh a piece of luggage 13 in the following manner. With device 17 disposed in the palm of the hand of the user, cover 31 is urged into direct contact against the underside of handle 15, preferably with the center portion of handle 15 extending longitudinally within recess 37. Then, by lifting device 17 and handle 15 together upward so as to suspend luggage 13 from the floor surface, the force applied to housing 25 due to the load of luggage 13 can be used by electronics 27 to calculate luggage weight.

Specifically, with luggage 13 suspended above the floor surface, the load of luggage 13 directly imparts a commensurate compressive force onto housing 25 which is, in turn, detected by weight sensor 39. Because the force measured by weight sensor 39 is directly proportional to the baggage weight, microcontroller 41 can readily calculate the exact weight of baggage using the electrical output signal generated by sensor 39.

In turn, the luggage weight calculated by MCU 41 is wirelessly transmitted to smart device 19 via RF module 47. In lieu of wireless signal transmission, it is to be understood that physical communication cables could be utilized to directly connect weight measurement device 17 and smart device 19 without departing from the spirit of the present invention.

Figure 5B:
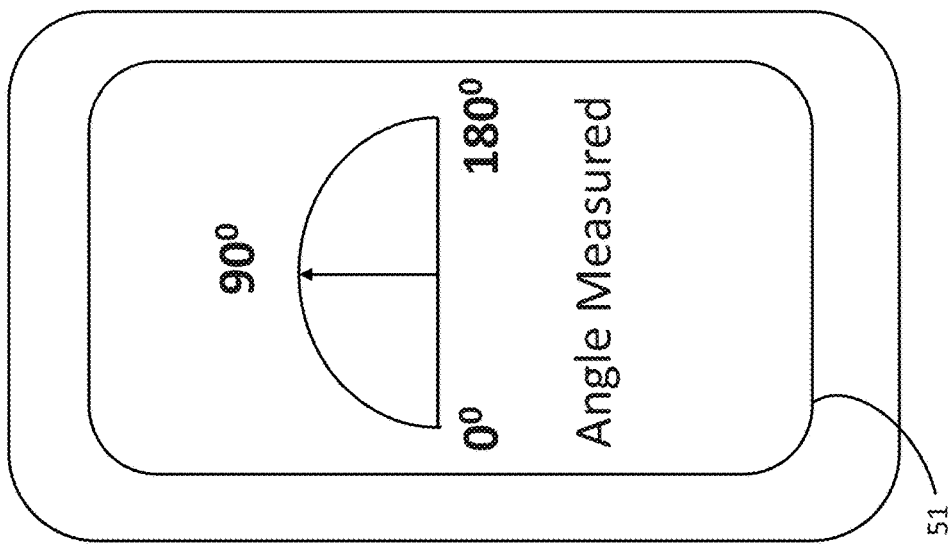
Figure 5A:
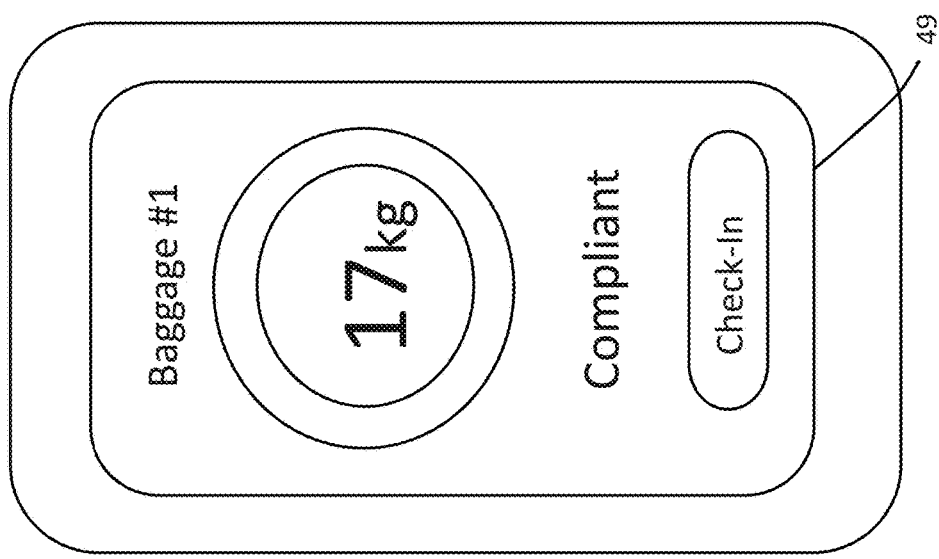

As seen most clearly in FIG. 5(a), a designated software application is preferably installed on smart device 19 that provides the received measurement on a highly intuitive weight measurement display screen 49. Among other things, the display of weight measurement data on smart device 19 eliminates the need for device 17 to be equipped with an analog or digital display, thereby allowing for a more compact and cost-effective design.

For accuracy, it is essential that the gravitational force of luggage 13 be imparted directly downward onto cover 31 (i.e., orthogonal to longitudinal axis $L_A$ of device 17). Accordingly, accelerometer 43 measures the angle of orientation of device 17 during the weight measurement process and transmits the device orientation signal to smart device 19.

As seen most clearly in FIG. 5(b), the orientation signal received by smart device 19 is preferably displayed on a highly intuitive device orientation display screen 51 provided as part of the software application. Accordingly, the user preferably orients handle 15 and device 17 such that display screen 51 indicates that longitudinal axis $L_A$ of device 17 extends at 90 degrees relative to the line of gravity. Once a defined period of proper orientation has been reached, an accurate weight measurement is taken by device 17 and, in turn, transmitted to smart device 19.

As noted briefly above, device 17 is additionally designed to detect shock conditions, preferably across multiple axes. When a shock impact above a certain threshold is detected by accelerometer 43, data relating to the shock condition is stored in data logger 45 for subsequent user evaluation. As shown in FIG. 5(c), data compiled by logger 45 is preferably transmitted to smart device 19 via RF module 47 and displayed on a highly intuitive shock report display screen 53 provided as part of the software application. In the shock report, the date, time and degree of shock force is displayed for review.

As can be appreciated, a high impact shock condition alerts the user to immediately inspect luggage 13, as well as the contents retained therein, for damage. Since most airlines require that luggage damage complaints be lodged within a defined period after a flight, the shock detection feature afforded by device 17 provides the user with an important, early indication of potential baggage damage.

In the present embodiment, device 17 is described above as being manually retained against handle 15 by the user. However, it is to be understood that device 17 could be alternatively constructed to allow for releasable securement to handle 15 without departing from the spirit of the present invention. Extended connection of device 17 to luggage 13 may provide certain advantages including, but not limited to, ease of use as well as shock monitoring for potential instances of luggage mishandling, as referenced above.

For instance, device 17 may be provided with one or more integral fastening elements, such as adhesive straps. As a result, the fastening elements can be wrapped around handle 15 and secured in a closed loop configuration to temporarily secure device 17 to handle 15.

Alternatively, device 17 could be constructed as a generally tubular sleeve that wraps fittingly around a suitable length of luggage handle 15. With this design, it is envisioned that multiple variations of device 17 could be constructed to allow for conformance with various size, shapes and styles of luggage handles.

As yet another alternative, it is envisioned that device 17 could be permanently integrated into handle 15 (e.g., by the luggage manufacturer) without departing from the spirit of the present invention. As a benefit of the aforementioned construction, the user would not require possession of any separate tool, scale or device, other than a smart phone, in order to weigh a piece of luggage.

As yet still another alternative, device 17 could be integrated into a glove or other similar wearable device. In this manner, device 17 would be readily available to the user for conducting weight measurements.

Referring back to FIG. 1, smart device 19 represents any mobile compute device, preferably handheld, that is able to wirelessly communicate with weight measurement device 17 and, in turn, transmit compiled weight measurement data to travel facilitator 21 (e.g., via the internet). To facilitate communication with travel facilitator 21, smart device 19 is preferably installed with a designated software application, as referenced briefly above.

The use of smart device 19 in the weight measurement process affords certain notable and previously unforeseen advantages, some of which were referenced briefly above.

As a first advantage, the ability of the user to read weight measurements via smart device 19 thereby eliminates the need for a weight display, digital or analog, to be provided in device 17. This enables weight measurement device 17 to be relatively compact, ergonomic, and easy to use (notably, by simply lifting luggage 13 by its designed handle 15 with device 17 properly disposed thereagainst).

As a second advantage, the ability of the user to monitor luggage orientation readings via smart device 19 allows for more accurate weight measurements to be obtained.

As a third advantage, the use of smart device 19 in the weight measurement process allows for collected data to be sent to travel facilitator 21 for the aggregation and analysis of historical luggage weight data, as will be explained further below. Additionally, the use of a designated software application on smart device 19 enables travel facilitator 21 to readily apply software updates and enhancements, as needed.

As referenced briefly above, travel facilitator 21 collects, organizes, and analyzes historical weight measurement data from various linked smart devices 19. For simplicity, a single smart device 19 and weight measurement device 17 is shown in FIG. 1. However, it is to be understood that facilitator 21 preferably receives a large quantity of weight measurement data from various users over an extended period of time.

Facilitator 21 is shown comprising a central controller 61 that receives and analyzes luggage weight data from each smart device 19 and, in turn, stores historical weight information in a data storage device 63 in communication therewith. In this manner, controller 61 effectively serves as the hub of system 11.

Central controller 61 is represented herein as an application server that is programmed to efficiently communicate with the designated software application operating on each smart device 19. However, it is to be understood that central controller 61 could be in the form of any compute device that is able to receive and process data.

Airline computer network 23 represents any airline network that traditionally manages flight information on both a passenger basis (e.g., passenger name, passenger travel itinerary, passenger luggage claims and the like) as well as a broader airline flight basis (e.g., flight number, flight itinerary, flight passenger lists and the like). For simplicity, a single airline computer network 23 is represented herein. However, it is to be understood that system 11 could be integrated with multiple transportation service provider computer networks (i.e., for different airlines and across different commercial travel industries) without departing from the spirit of the present invention.

Airline computer network 23 is represented herein as comprising a central controller 65, such as a server, that has access to all airline travel data. In turn, central controller 65 is linked with a plurality of individual compute devices 67-1 and 67-2, such as designated computer terminals, check-in kiosks and the like. Each compute device 67 is adapted to input and/or retrieve flight data that is used in managing operation of the airline.

Overall Operation of Travel Facilitation System 11

The unique architecture afforded by travel facilitation system 11 provides certain advantages and enhancements over traditional luggage scales. Improvements afforded by system 11 include, but are not limited to, (i) a simplification of user-initiated luggage weight compliance checks, (ii) an electronic check-in process to facilitate airline management operations, and (iii) a passenger-level incentive, or reward, program that is based on historical baggage weight data collected, the details of each feature being explained further below.

Figure 6:
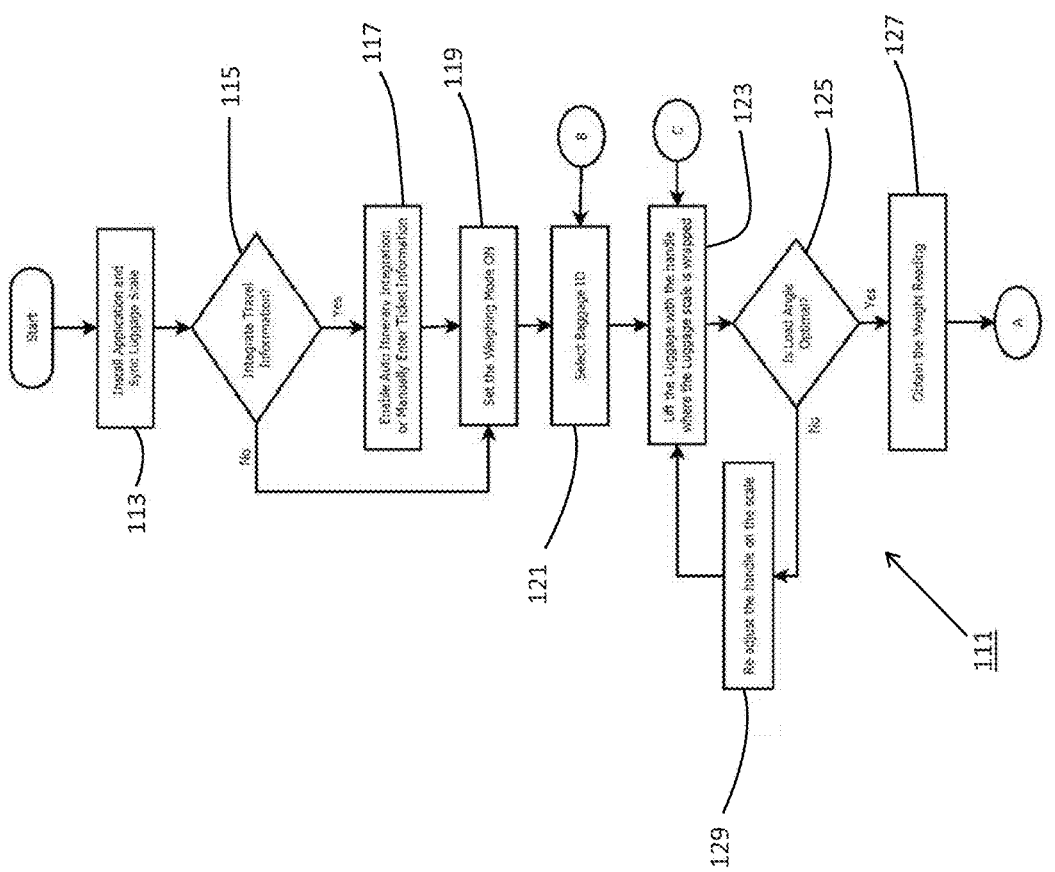
FIG. 6 is a flow chart depicting an example of a method for initiating a simplified luggage weight compliance check using the travel facilitation system shown in FIG. 1.
Figure 6:
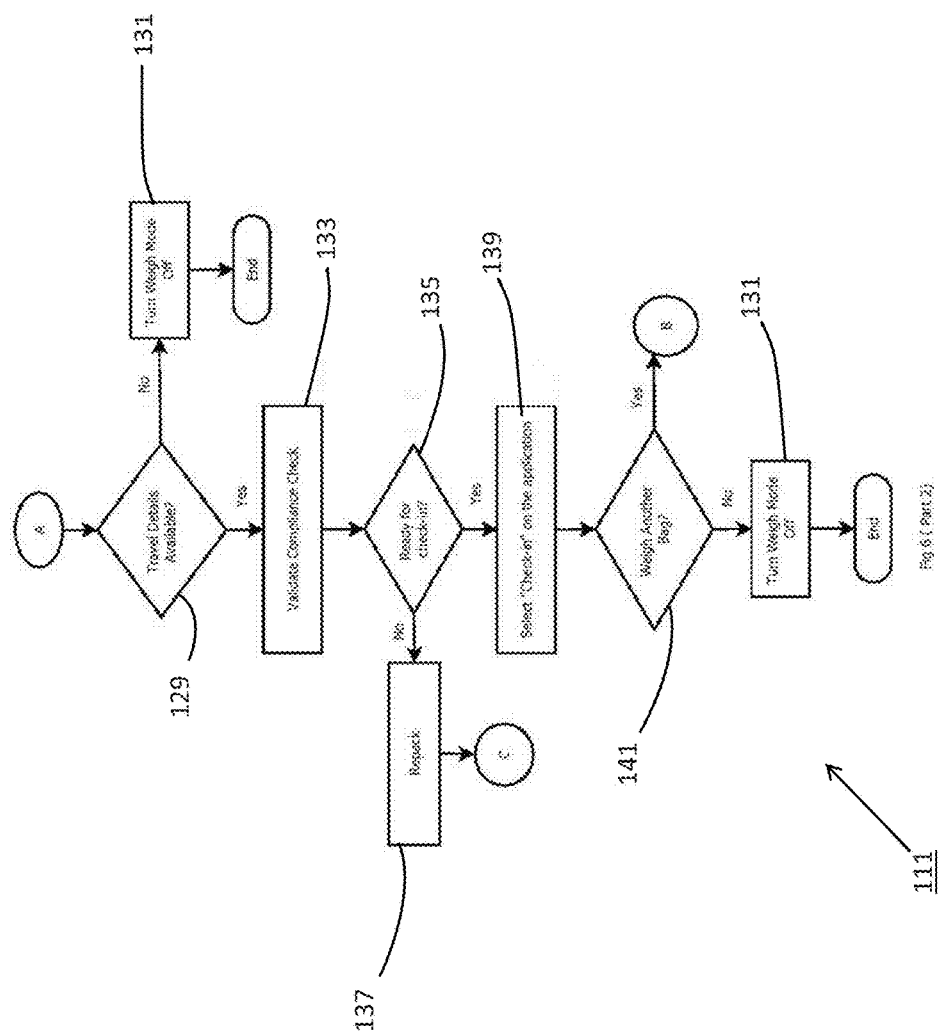

For instance, referring now to FIG. 6, there is shown a flow chart depicting one example of a method for initiating a simplified luggage weight compliance check using system 11, the method being identified generally by reference numeral 111. In the first step of method 111, the user installs the software application on smart device 19 and synchronizes communication between smart device 19 and weight measurement device 17, as represented by reference numeral 113.

Upon completion of the initial setup, the user has the option to integrate travel information with an impending weight measurement, as shown in step 115. If travel integration is desired, itinerary information (e.g., flight origin, flight destination, flight number, airline name and class of travel) is imported into smart device 19 as part of itinerary integration step 117. As part of integration step 117, itinerary information can be imported into smart device 19 either (i) manually, through direct input into designated windows in the software application, or (ii) automatically, by parsing through an appropriate data file (e.g., a ticket confirmation email). Upon completion of integration step 117, process 111 proceeds to step 119. Further, it should be noted that, if travel integration is not desired in step 115, process 111 skips directly from step 115 to step 119.

In step 119, weight measurement device 17 is activated using smart device 19. Thereafter, in step 121, the user inputs unique identifiers relating to a first piece of luggage 13 to be weighed (e.g., bag 1, black suitcase, or the like). This feature enables the user to distinguish between multiple pieces of travel luggage.

Once step 121 is completed, the weight measurement process commences. Specifically, in step 123, device 17 is maintained against the underside of handle 15. Together, handle 15 and device 17 are lifted until luggage 13 is suspended just above the flooring surface. In step 125, the load angle of device 17 is examined to ensure proper orientation (i.e., by taking readings from accelerometer 43). If the load angle is deemed proper, a weight reading is rendered in step 127. If the load angle of device 17 is suboptimal, the user readjusts the orientation of device 17 in step 129. Thereafter, process returns to step 123 and another load angle evaluation is rendered.

Having completed the desired weight measurement in step 127, the user is then able to evaluate the weight measurement in relation to flight-based baggage restrictions. In order to evaluate the weight measurement as such, a determination whether flight-based baggage restrictions are even available is first undertaken in step 129. If no travel details are available, the user turns off the weigh mode in step 131 and process 111 terminates. Otherwise, if travel details are available, a compliance check is rendered in step 133. Specifically, in step 135, the measured weight of the luggage is compared against flight baggage restrictions to determine if the luggage is compliant for check-in.

If the weight of the luggage exceeds flight baggage restrictions, the user can engage in a repacking process until the luggage is compliant, as represented in step 137, and then the process returns back to step 123. Otherwise, if the luggage is deemed compliant, a corresponding message is displayed on smart device 19 (e.g., "compliant") and the user can then, in response, effectively "check-in" the bag through the software application in step 139 (i.e., electronically tag the luggage as being ready for check-in with the airline), as will be explained further in detail below.

Thereafter, the user has the option to weigh another bag 13 in step 141. If no other bags are to be weighed, process 111 skips to step 131 and terminates. If additional bags are to be weighed, method 111 returns back to step 121 and the process repeats until all bags are adequately self-checked by the user.

Figure 7:
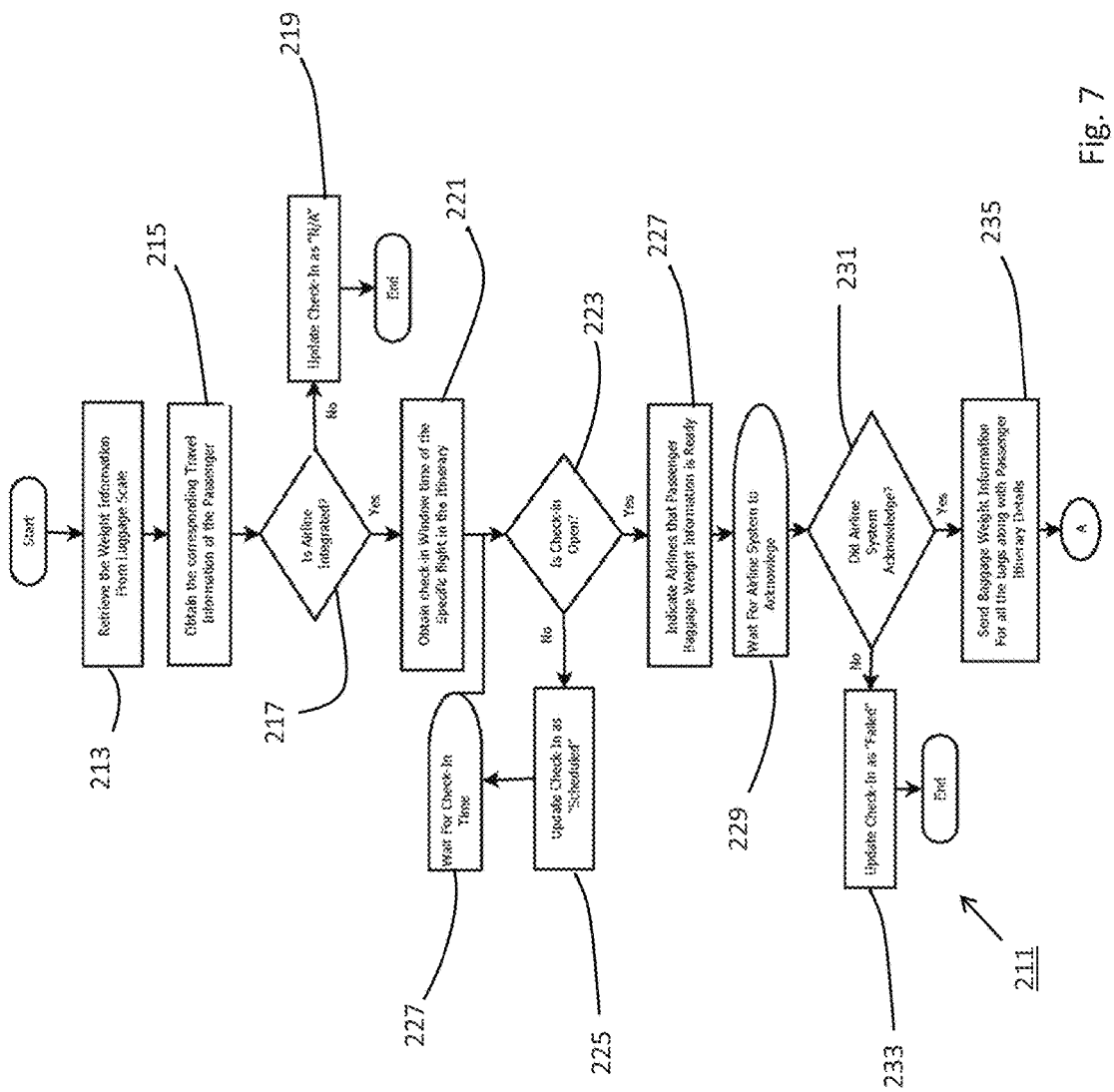
FIG. 7 is a flow chart depicting an example of a method of electronic check-in using the travel facilitation system shown in FIG. 1.
Figure 7:
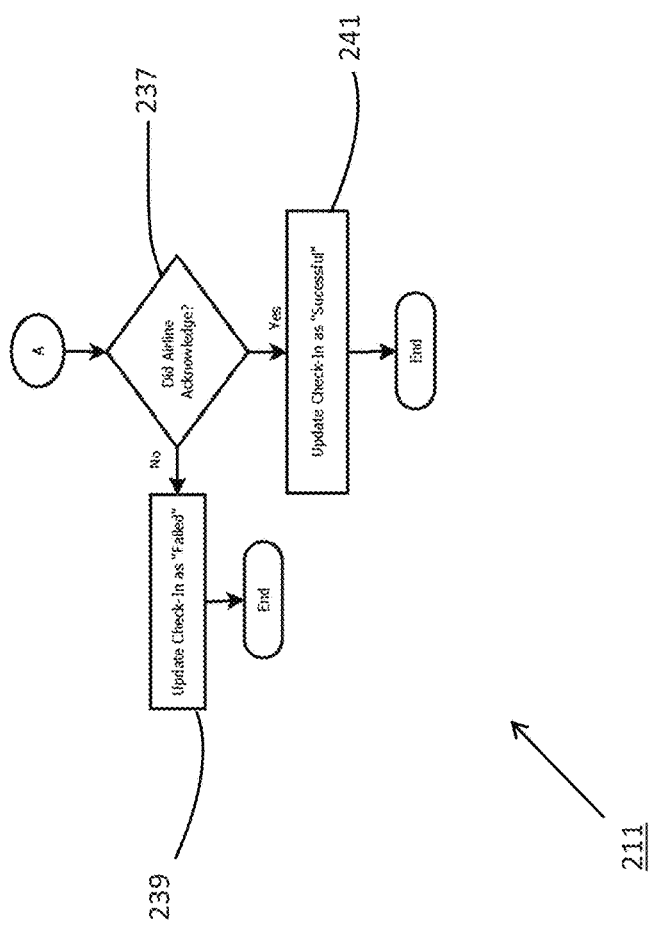

Referring now to FIG. 7, there is shown a flow chart depicting how a user-initiated, electronic check-in process can, in turn, be utilized by an airline for numerous purposes (e.g., to facilitate management of basic airline operations, to streamline the airline check-in process and/or adequately plan for atypical cargo loads), the method being identified generally by reference numeral 211. As can be appreciated, method 211 is initiated by the user in step 139 of method 111 by activating the electronic "check-in" feature in the software application for baggage previously determined as being flight-compliant (e.g. by touching an on-screen button).

In response to the user-initiated activation of the electronic check-in feature, the weight information associated with the electronic check-in is sent from smart device 19 to central controller 61, as represented by reference numeral 213. In turn, in step 215, central controller 61 retrieves the ticket information previously integrated in step 117 (i.e., the active airline ticket in the name of the passenger).

Then, in step 217, travel facilitator 21 makes a determination whether the airline identified in the ticket information is integrated with travel facilitator 21. In other words, facilitator 21 determines whether the airline is an authorized participant in the electronic check-in process afforded by system 11. If the airline is not authorized to use the electronic check-in feature, central controller 61 updates the user-initiated electronic check-in status as "Not Available" or "N/A" in step 219 and electronic check-in process 211 ends.

However, if the airline relies upon system 11 to collect electronic check-in data, central controller 61 obtains from airline controller 65 the electronic check-in period, or window, assigned for the specific passenger flight (e.g., the 24 hours immediately preceding departure), as represented in step 221. Upon retrieving the designated check-in period that is scheduled for the specific flight, central controller 65 determines, in step 223, whether passenger check-in is currently available in view thereof.

If electronic check-in is not currently available, central controller 61 changes the electronic check-in status to "scheduled" in step 225. Additionally, in step 227, central controller 61 returns back to step 223 once the designated electronic check-in period has started.

If pre-flight, electronic check-in is available, central controller 61 sends a message to airline controller 65, in step 227, that the passenger has completed the electronic check-in process and, as a result, flight-specific weight measurement data is currently available for inspection and analysis.

Thereafter, central controller 61 waits for a corresponding acknowledgement from airline controller 65 in step 229. After a defined period, central controller 61 then determines whether the airline acknowledges the completed electronic check-in process, as represented by reference numeral 231.

If the airline does not acknowledge the message indicating that the electronic check-in process has been completed, as part of step 233, central controller 61 updates the user-initiated electronic check-in status as "Failed" and electronic check-in process 211 ends.

However, if the airline acknowledges the message indicating that the electronic check-in process is complete, central controller 61 transmits to airline controller 65 all of the electronic check-in data, as represented by step 235. Notably, central controller 61 transmits to airline controller 65, inter alia, the weight measurements for each bag, along with any unique bag identifiers and pertinent flight information. This data can be used, among other things, to streamline the airline check-in process.

In step 237, central controller 61 awaits acknowledgement of receipt of the electronic check-in data for a designated period. If acknowledgement is not received, in step 239, central controller 61 updates the user-initiated, electronic check-in status as "Failed" and process 211 ends. However if acknowledgement is received, in step 241, central controller 61 updates the user initiated check-in status on smart device 19 as "Successful" and process ends 211.

Completion of electronic check-in process 211 affords the airline with numerous advantages. In particular, the ability to obtain baggage weight information adequately before the flight departure time (e.g., 24 hours prior to travel) enables the airline to make important flight load determinations. For instance, if a lower than average baggage load is anticipated, the airline may opt to transport commercial cargo on the flight, thereby creating an additional revenue source. Furthermore, because system 11 only utilizes data compiled using weight measurement devices 17, an airline can be assured that all compiled electronic check-in data is highly reliable.

As can be appreciated, it is envisioned that the aggregation of luggage weight measurements in database 63 over an extended period of time introduces a number of notable, previously unrealized, advantages.

For instance, luggage weight data retained in database 63 can be retrieved by a user to assist in luggage management when engaged in travel. Specifically, it has been found that a user traveling with multiple bags often experiences difficulty in remembering recent weight measurements on a bag-by-bag basis. Accordingly, as shown in FIG. 8, the user can retrieve a weight result display screen 311 on smart device 19 (i.e. through the designated software application) to view recent measurements. In view of the measurements, the user may opt to add, remove, and/or redistribute articles amongst the bags in such a manner that minimizes the risk of excess baggage costs being imposed by an airline.

As another example, airlines receive considerable value when passengers engage in electronic check-in process 211, as noted above. Accordingly, airlines may consider incentivizing early electronic check-in for compliant passengers by awarding travel miles, preferential treatment and the like.

As a final example, an airline may opt to monitor and evaluate the baggage history for selected travelers over a designated period (e.g., the preceding 5 years, the last 20 flights, etc.,) and, in turn, create a rewards, or merit, system based thereon. In this system, the airline retrieves from facilitator 21 a color-based score, or level, that is calculated based on measured bag weights as a percentage of its designated flight allotment. In this manner, the rewards system operates on a sliding scale, with more points being afforded as each piece of travel baggage falls further beneath the designated weight allowance. Using this information, the airline can reward travelers who travel with limited baggage loads.

The rewards system may calculate the status level based on a simple average or arithmetic mean of historical bag allotment percentages reached. For instance, in FIG. 9, a sample chart 411 is depicted which displays a score level based on the percentage of baggage allowance utilized. Alternatively, the rewards system may incorporate more complex factors in its calculations (e.g., status level weighted for particular flight routes, increased travel and/or repeated compliance with a particular threshold).

Figure 10:
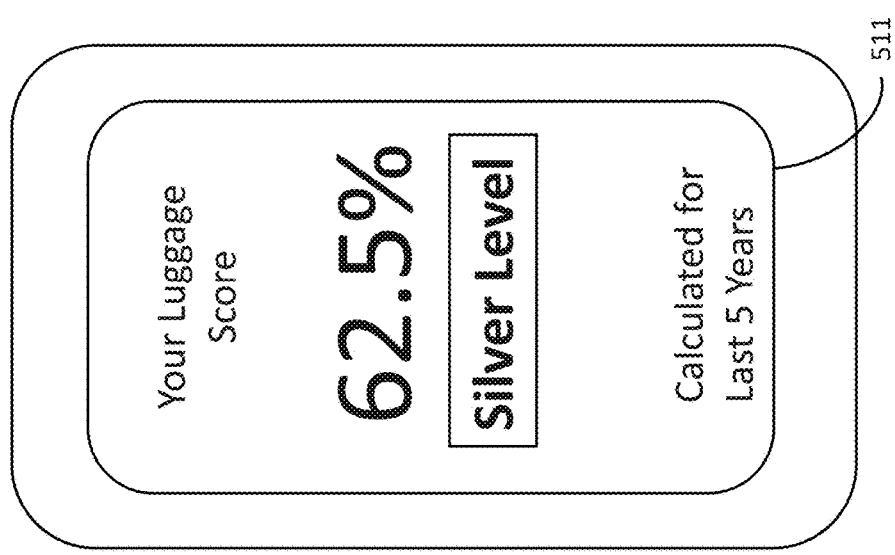
FIG. 10 is a sample screen display of the smart device shown in FIG. 1, the sample screen display illustrating an example of a rewards score that is based on the values represented in the chart of FIG. 9.

Using the software application on smart device 19, the user can retrieve a luggage score display screen 511 from controller 61 for a single airline or across all monitored airlines, as shown in FIG. 10. In display screen 511, the user can view, inter alia, the percentage of weight allotment used (e.g. 62.5%) over a defined period (e.g. last five years) as well as the status level achieved (e.g. silver level).

The embodiments shown above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for facilitating travel, comprising:
    (a) a first weight measurement device, the first weight measurement device being adapted to measure the weight of a first set of luggage; and
    (b) a smart device in electronic communication with said first weight measurement device for receiving and displaying luggage weight data from said first weight measurement device;
    (c) a travel facilitator, the travel facilitator comprising a central controller separate from and in electronic communication with the first weight measurement device via the smart device, the central controller receiving the measured weight of each luggage in the first set, and aggregating and analyzing luggage weight data from a variety of sources;
    (d) wherein the measured weight of each luggage in the first set is configured for electronic retrieval by a selection of users in electronic communication with the central controller;
    (e) wherein the first weight measurement device is adapted for electronic synchronization with said first smart device.

2. The travel facilitation system of claim 1 wherein an angle of orientation of the weight measurement device is displayed on the first smart device.

3. The travel facilitation system of claim 1 wherein the first smart device is programmed with a software application to facilitate operation of the first weight measurement device and to assist in electronic communication between the first smart device with the central controller.

4. The travel facilitation system of claim 1 wherein the central controller for the travel facilitator electronically collects and stores the measured weight of each luggage in the first set.

5. The travel facilitation system of claim 4 further comprising a second weight measurement device that is adapted to measure the weight of a second set of luggage, the measured weight of each luggage in the second set being received by the central controller.

6. The travel facilitation system of claim 5 wherein the central controller stores the measured weight of each luggage in the first and second sets on a user-based level.

7. The travel facilitation system of claim 6 wherein the central controller stores the measured weight of each luggage in the first and second sets on an itinerary-based level.

8. The travel facilitation system of claim 1 wherein the first weight measurement device comprises:
    (a) an outer housing adapted to directly conform to at least a portion of a handle for a first piece of luggage; and
    (b) electronics disposed in the outer housing, the electronics being adapted to measure a force applied onto the outer housing when lifting the first piece of luggage using the handle;
    (c) wherein the electronics uses the measured force to calculate the weight of the first piece of luggage.

9. The travel facilitation system of claim 8 wherein the electronics comprises:
    (a) a weight sensor for measuring the force applied to the outer housing; and
    (b) a microprocessor in electrical connection with the weight sensor for translating the measured force into a weight for the first piece of luggage.

10. The system of claim 9 further comprising an accelerometer in electrical connection with the microprocessor for measuring the orientation of the outer housing.

11. The system of claim 10 wherein the accelerometer monitors movement indicative of a shock condition.

12. The system of claim 9 further comprising a radio frequency (RF) module that is adapted to wirelessly transmit the measured weight for the first piece of luggage to a synchronized smart device.

13. The system of claim 8 wherein the outer housing includes an exposed surface with a longitudinal recess shaped to receive at least a portion of the handle.

14. The system of claim 8 wherein the first weight measurement device is in the absence of means for securing the outer housing to the handle.

15. The system of claim 8 wherein the first weight measurement device is in the absence of a display for reading the measured weight of each luggage in the first set.

* * * * *